US012748338B2

(12) United States Patent
Guha et al.

(10) Patent No.: US 12,748,338 B2
(45) Date of Patent: Sep. 29, 2026

(54) NON-GAUSSIAN PHOTONIC STATE ENGINEERING

(71) Applicants: Arizona Board of Regents on Behalf of the University of Arizona, Tucson, AZ (US); UT-BATTELLE, LLC, Oak Ridge, TN (US)

(72) Inventors: Saikat Guha, Tucson, AZ (US); Christos Gagatsos, Tucson, AZ (US); Joseph Lukens, Oak Ridge, TN (US)

(73) Assignees: Arizona Board of Regents on Behalf of the University of Arizona, Tucson, AZ (US); UT-BATTELLE, LLC, Oak Ridge, TN (US)

( * ) Notice: Subject to any disclaimer, the term of this patent is extended or adjusted under 35 U.S.C. 154(b) by 280 days.

(21) Appl. No.: 18/684,208

(22) PCT Filed: Aug. 17, 2022

(86) PCT No.: PCT/US2022/040528
§ 371 (c)(1),
(2) Date: Feb. 16, 2024

(87) PCT Pub. No.: WO2023/172289
PCT Pub. Date: Sep. 14, 2023

(65) Prior Publication Data

US 2024/0369902 A1 Nov. 7, 2024

Related U.S. Application Data

(60) Provisional application No. 63/233,982, filed on Aug. 17, 2021.

(51) Int. Cl.

*G02F 1/35* (2006.01)
*G06N 10/20* (2022.01)
*G06N 10/70* (2022.01)

(52) U.S. Cl.

CPC ............... *G02F 1/35* (2013.01); *G06N 10/20* (2022.01); *G06N 10/70* (2022.01); *G02F 2203/50* (2013.01); *G02F 2203/56* (2013.01)

(58) Field of Classification Search

CPC ........ G06N 10/20; G06N 10/70; G06N 10/00; G06N 10/40; G06N 10/60; G02F 1/35; G02F 2203/50; G02F 2203/56

(Continued)

(56) References Cited

U.S. PATENT DOCUMENTS

2020/0274703 A1 8/2020 Lukens et al.
2023/0341744 A1 10/2023 Pfister et al.

FOREIGN PATENT DOCUMENTS

WO 2020223718 A1 11/2020

OTHER PUBLICATIONS

M. Kues, et al., 'On-chip generation of high-dimensional entangled quantum states and their coherent control', Nature, vol. 546, Jun. 29, 2017, pp. 622-631. (Year: 2017).*

(Continued)

*Primary Examiner* — Arnel C Lavarias
(74) *Attorney, Agent, or Firm* — Cozen O'Connor

(57) ABSTRACT

An apparatus for generating a non-Gaussian quantum state includes a quantum-optical frequency-comb source that generates pairs of entangled spectral modes and a series of electrically controllable optical transformation modules that receive the entangled spectral modes from the frequency-comb source. Each of two or more of the optical transformation modules includes a spectral mode phase shifter that applies phase shifts to some of the spectral modes and a spectral mode mixer that couples some of the spectral modes. The apparatus also includes an output interface with photon-number-resolving (PNR) detectors that detect a first subset of the spectral modes. The output interface also (Continued)

includes an output port that outputs a second subset of the spectral modes that are not detected by the PNR detectors.

23 Claims, 6 Drawing Sheets

(58) Field of Classification Search
USPC .................. 359/107; 708/191; 977/932, 933
See application file for complete search history.

(56) References Cited

OTHER PUBLICATIONS

Z. Yang et al., 'A squeezed quantum microcomb on a chip', Nature Communications, 12:4781, Aug. 6, 2021, pp. 1-8. (Year: 2021).*
Kues, M. et al. "Quantum optical microcombs" Nature Photonics vol. 13, pp. 170-179; Publication [online] Feb. 21, 2019 [retrieved on Sep. 19, 2023) DOI: 10.1038/s41566-019-0363-0; figures 1, 3A-3C, 4C, and 5; p. 171, paragraphs 1-3; p. 171, paragraph 5-p. 172, paragraph 3; p. 173, paragraph 3-p. 17 4, paragraph 1; p. 175, paragraphs 4-8; p. 177, paragraph 2.
Jun-ichi Yoshikawa et al., "Invited Article: Generation of one-million-mode continuous-variable cluster state by unlimited time-domain multiplexing", APL Photonics 1, 11 pages, Sep. 2016, DOI: 10.1063/1.4962732.
C. Gagatsos et al., "Efficient representation of Gaussian states for multimode non-Gaussian quantum state engineering via subtraction of arbitrary number of photons", American Physical Society (APS), Physical Review A, pp. 1-15, Apr. 22, 2019, DOI: 10.1103/physreva.99.053816.
S. D. Bartlett et al., "Universal continuous-variable quantum computation: Requirement of optical nonlinearity for photon counting", American Physical Society (APS), Physical Review A, pp. 1-6, Mar. 19, 2002, DOI: 10.1103/physreva.65.042304.
S. L. Braunstein et al., "Quantum information with continuous variables", American Physical Society (APS), Reviews of Modern Physics, pp. 1-65, Oct. 13, 2004, DOI: 10.1103/revmodphys.77.513.
S. Lloyd et al., "Quantum Computation over Continuous Variables", American Physical Society (APS), Physical Review Letters, pp. 1-9, Oct. 27, 1998, DOI: 10.1103/physrevlett.82.1784.
Joseph M. Lukens et al., "Frequency-encoded photonic qubits for scalable quantum information processing", Optica, vol. 4, No. 1, pp. 8-16, Jan. 2017, DOI: 10.1364/OPTICA.4.000008.
D. Su et al., "Conversion of Gaussian states to non-Gaussian states using photon-number-resolving detectors", American Physical Society (APS), Physical Review A, pp. 1-32, Nov. 2019, DOI: 10.1103/physreva.100.052301.
A. J. Pizzimenti et al., "Non-Gaussian photonic state engineering with the quantum frequency processor", American Physical Society (APS), Physical Review A, pp. 1-13, Dec. 2021, DOI: 10.1103/physreva.104.062437.
M. Pysher et al., "Parallel Generation of Quadripartite Cluster Entanglement in the Optical Frequency Comb", American Physical Society (APS), Physical Review Letters, pp. 1-4, Jul. 2011, DOI: 10.1103/physrevlett.107.030505.
M. Chen et al., "Experimental Realization of Multipartite Entanglement of 60 Modes of a Quantum Optical Frequency Comb", American Physical Society (APS), Physical Review Letters, pp. 1-5, Mar. 2014, DOI: 10.1103/physrevlett.112.120505.
C. S. Hamilton et al., "Gaussian Boson Sampling", American Physical Society (APS), Physical Review Letters, pp. 1-5, Oct. 2017, DOI: 10.1103/physrevlett.119.170501.
Hsuan-Hao Lu et al., "Electro-Optic Frequency Beam Splitters and Tritters for High-Fidelity Photonic Quantum Information Processing", American Physical Society (APS), Physical Review Letters, pp. 1-6, Jan. 2018, DOI: 10.1103/physrevlett.120.030502.
Hsuan-Hao Lu et al., "Quantum Information Processing With Frequency-Comb Qudits", IEEE Photonics Technology Letters, vol. 31, No. 23, pp. 1858-1861, Dec. 1, 2019, DOI: 10.1109/LPT.2019.2942136.
Hsuan-Hao Lu et al., "A controlled-NOT gate for frequency-bin qubits", npj Quantum Information, pp. 1-8, Mar. 2019, DOI: 10.1038/s41534-019-0137-z.
Weedbrook, Christian et al. "Gaussian Quantum Information", American Physical Society, Reviews of Modern Physics 84.2, 50 pages, 2012, DOI: 10.1103/RevModPhys.84.621.
N. Quesada et al., "Simulating realistic non-Gaussian state preparation", American Physical Society (APS), Physical Review A, pp. 1-12, Sep. 5, 2019, DOI: 10.1103/physreva.100.022341.
Olivier Pfister, "Continuous-variable quantum computing in the quantum optical frequency comb", IOP Publishing, Journal of Physics B: Atomic, Molecular and Optical Physics, pp. 1-36, Jul. 23, 2019, DOI: 10.1088/1361-6455/ab526f.
Hsuan-Hao Lu et al., "Fully Arbitrary Control of Frequency-Bin Qubits", American Physical Society (APS), Physical Review Letters, pp. 1-9, Aug. 17, 2020, DOI: 10.1103/physrevlett.125.120503.
Z. Yang et al., "A squeezed quantum microcomb on a chip", Springer Science and Business Media LLC, Nature Communications, pp. 1-9, Mar. 4, 2021, DOI: 10.1038/s41467-021-25054-z.
Hsuan-Hao Lu et al., "Agile frequency transformations for dense wavelength-multiplexed communications", Opt. Express, vol. 28, No. 14, pp. 20379-20390, Jul. 6, 2020, DOI: 10.1364/OE.396142.
Hsuan-Hao Lu et al., "Quantum interference and correlation control of frequency-bin qubits", Optica, vol. 5, Issue 11, pp. 1455-1460, Nov. 2018, DOI: 10.1364/OPTICA.5.001455.
Xuan Zhu et al., "Hypercubic cluster states in the phase-modulated quantum optical frequency comb", Optica, vol. 8, Issue 3, pp. 281-290, Mar. 2021, DOI: 10.1364/OPTICA.411713.

* cited by examiner

NON-GAUSSIAN PHOTONIC STATE ENGINEERING

CROSS-REFERENCE TO RELATED APPLICATION(S)

This application claims priority to and the benefit of U.S. Provisional Application Patent Ser. No. 63/233,982, entitled "NON-GAUSSIAN PHOTONIC STATE ENGINEERING," filed Aug. 17, 2021, the entire disclosure of which is hereby incorporated by reference.

STATEMENT AS TO FEDERALLY SPONSORED RESEARCH

This invention was made with government support under Grant No. DE-AC05-00OR22725, awarded by DOE and Grant No. N00014-19-1-2189, awarded by NAVY/ONR. The government has certain rights in the invention.

TECHNICAL FIELD

This disclosure relates to non-gaussian photonic state engineering.

BACKGROUND

Gaussian states of bosonic modes can be described as quantum states of optical waves that can be prepared using quadrature squeezed optical waves and passive linear optical elements. Gaussian states and their feasibility of experimental production are useful for quantum information processing. However, Gaussian states and Gaussian measurements (e.g., homodyne and heterodyne detection) do not constitute a universal set, i.e., resources that would allow universal quantum computation. Thus, techniques for generating non-Gaussian states are useful.

SUMMARY

In one aspect, in general, an apparatus for generating a non-Gaussian quantum state associated with one or more spectral modes comprises: a quantum optical frequency comb source comprising at least one nonlinear optical medium and configured to provide a plurality of spectral modes spaced at a frequency-bin spacing, where the spectral modes include a plurality of pairs of entangled spectral modes, each pair of entangled spectral modes including: a first spectral mode centered at a first frequency, and a second spectral mode entangled with the first spectral mode and centered at a second frequency that is spaced from the first frequency at a multiple of the frequency-bin spacing; and a plurality of electrically controllable optical transformation modules connected in series with a first module in the series receiving spectral modes from the quantum optical frequency comb, where two or more of the modules each comprise: a spectral mode phase shifter configured to apply respective phase shifts to different spectral modes based on at least a first electrical signal, and a spectral mode mixer coupled to the spectral mode phase shifter and configured to couple spectral modes centered at different frequencies based on at least a second electrical signal.

Aspects can include one or more of the following features.

One or more of the electrically controllable optical transformation modules are configured to transform each pair of entangled spectral modes into single-mode squeezed vacuum states.

Each spectral mode phase shifter comprises a Fourier-transform pulse shaper.

Each spectral mode mixer comprises an electro-optic phase modulator.

The apparatus further comprises an output interface coupled to a last module in the series, the output interface including: a plurality of photon number resolving (PNR) detectors configured to detect respective spectral modes of more than one and fewer than all spectral modes output from the last module in the series, and at least one port providing at least one output spectral mode from the last module in the series not detected by any of the PNR detectors.

The output interface further comprises a wavelength-dependent element between the last module and the plurality of PNR detectors.

The wavelength-dependent element comprises at least one of: a grating or a prism.

Each PNR detector is configured to generate a detection signal that distinguishes a detected photon number equal to zero from a detected photon number equal to one, in each of a plurality of time slots; and distinguishes a detected photon number equal to one from at least one detected photon number greater than one, in each of the plurality of time slots.

The apparatus further comprises a trigger module configured to generate a trigger signal based on detection signals from the plurality of PNR detectors indicating one or more time slots in which the port providing at least one output spectral mode corresponds to a non-Gaussian quantum state.

The non-Gaussian quantum state comprises a quantum superposition of continuous variable (CV) optical wave quadrature states.

The quantum superposition comprises a superposition of optical waves with opposite phases.

The non-Gaussian quantum state is input to a module that includes one or more optical elements that provide at least one Gottesman-Kitaev-Preskill (GKP) qubit.

The one or more optical elements include at least one optical beamsplitter.

The trigger signal is based on detection signals that include a plurality of the detection signals each indicating a photon number of zero in at least one time slot.

The last module in the series consists essentially of a spectral mode mixer configured to couple spectral modes centered at different frequencies based on an electrical signal.

The first module in the series consists essentially of a spectral mode mixer configured to couple spectral modes centered at different frequencies based on an electrical signal.

A plurality of the modules in the series are integrated on a common photonic integrated circuit.

The frequency-bin spacing is a free spectral range of an optical parametric oscillator that includes the nonlinear optical medium.

In another aspect, in general, a method for generating a non-Gaussian quantum state associated with one or more spectral modes comprises: providing from a quantum optical frequency comb source, comprising at least one nonlinear optical medium, a plurality of spectral modes spaced at a frequency-bin spacing, where the spectral modes include a plurality of pairs of entangled spectral modes, each pair of entangled spectral modes including: a first spectral mode centered at a first frequency, and a second spectral mode entangled with the first spectral mode and centered at a second frequency that is spaced from the first frequency at a multiple of the frequency-bin spacing; and receiving spectral modes from the quantum optical frequency comb into a first module of a plurality of electrically controllable optical transformation modules connected in series, where two or more of the modules each comprise: a spectral mode phase shifter configured to apply respective phase shifts to different spectral modes based on at least a first electrical signal, and a spectral mode mixer coupled to the spectral mode phase shifter and configured to couple spectral modes centered at different frequencies based on at least a second electrical signal.

In another aspect, in general, an apparatus for generating a non-Gaussian quantum state associated with one or more spectral modes comprises: a quantum optical frequency comb source comprising at least one nonlinear optical medium and configured to provide a plurality of spectral modes spaced at a frequency-bin spacing, a plurality of electrically controllable optical transformation modules connected in series with a first module in the series receiving spectral modes from the quantum optical frequency comb, where two or more of the modules each comprise: a spectral mode phase shifter configured to apply respective phase shifts to different spectral modes based on at least a first electrical signal, and a spectral mode mixer coupled to the spectral mode phase shifter and configured to couple spectral modes centered at different frequencies based on at least a second electrical signal; and an output interface coupled to a last module in the series, the output interface including: a plurality of photon number resolving (PNR) detectors configured to detect respective spectral modes of more than one and fewer than all spectral modes output from the last module in the series, and at least one port providing at least one output spectral mode from the last module in the series not detected by any of the PNR detectors; wherein each PNR detector is configured to generate a detection signal that: distinguishes a detected photon number equal to zero from a detected photon number equal to one, in each of a plurality of time slots, and distinguishes a detected photon number equal to one from at least one detected photon number greater than one, in each of the plurality of time slots.

Aspects can include one or more of the following features.

The number of spectral modes spaced at a frequency-bin spacing is three or more.

The apparatus further comprises a trigger module configured to generate a trigger signal based on detection signals from the plurality of PNR detectors indicating one or more time slots in which the port providing at least one output spectral mode corresponds to a non-Gaussian quantum state.

The plurality of spectral modes provided by the quantum optical frequency comb source comprise a Gaussian state.

The plurality of spectral modes provided by the quantum optical frequency comb source comprise a continuous-variable encoded state.

Aspects can have one or more of the following advantages.

The techniques described herein enable various implementations of non-Gaussian state production from input states populating discrete frequency bins. Some of the techniques include the use of controllable unitary operations with a quantum frequency processor, followed by photon-number-resolved (PNR) detection of ancilla modes. A quantum state of a single optical mode can be engineered at one reference frequency in a scalable way by leveraging Gaussian boson sampling (GBS) type state preparation (e.g., partial PNR detection on a multi-mode Gaussian state) across multiple frequencies using a comb-based continuous variables entanglement source and a quantum frequency processor to implement a linear mixing across the frequencies, and a heralding trigger obtained from detecting a subset of spectral modes.

Other features and advantages will become apparent from the following description, and from the figures and claims.

BRIEF DESCRIPTION OF THE DRAWINGS

The disclosure is best understood from the following detailed description when read in conjunction with the accompanying drawing. It is emphasized that, according to common practice, the various features of the drawing are not to-scale. On the contrary, the dimensions of the various features are arbitrarily expanded or reduced for clarity.

DETAILED DESCRIPTION

Non-Gaussian quantum states of light are useful resources for optical quantum information processing, but methods to generate them efficiently can be challenging to implement. Here we describe a generic approach for non-Gaussian state production from input states populating discrete frequency bins by using controllable unitary operations with a quantum frequency processor, followed by photon-number-resolved detection of ancilla modes. Leveraging and refining the K-function representation of quantum states in the coherent basis, we develop a theoretical model amenable to numerical optimization and, as specific examples, design quantum frequency processor circuits for the production of Schrödinger cat states, exploring the performance tradeoffs for several combinations of ancilla modes and circuit depth. Our scheme provides a valuable general framework for producing complex quantum states in frequency bins, paving the way for single-spatial-mode, fiber-optic-compatible non-Gaussian resource states.

Figure 1:
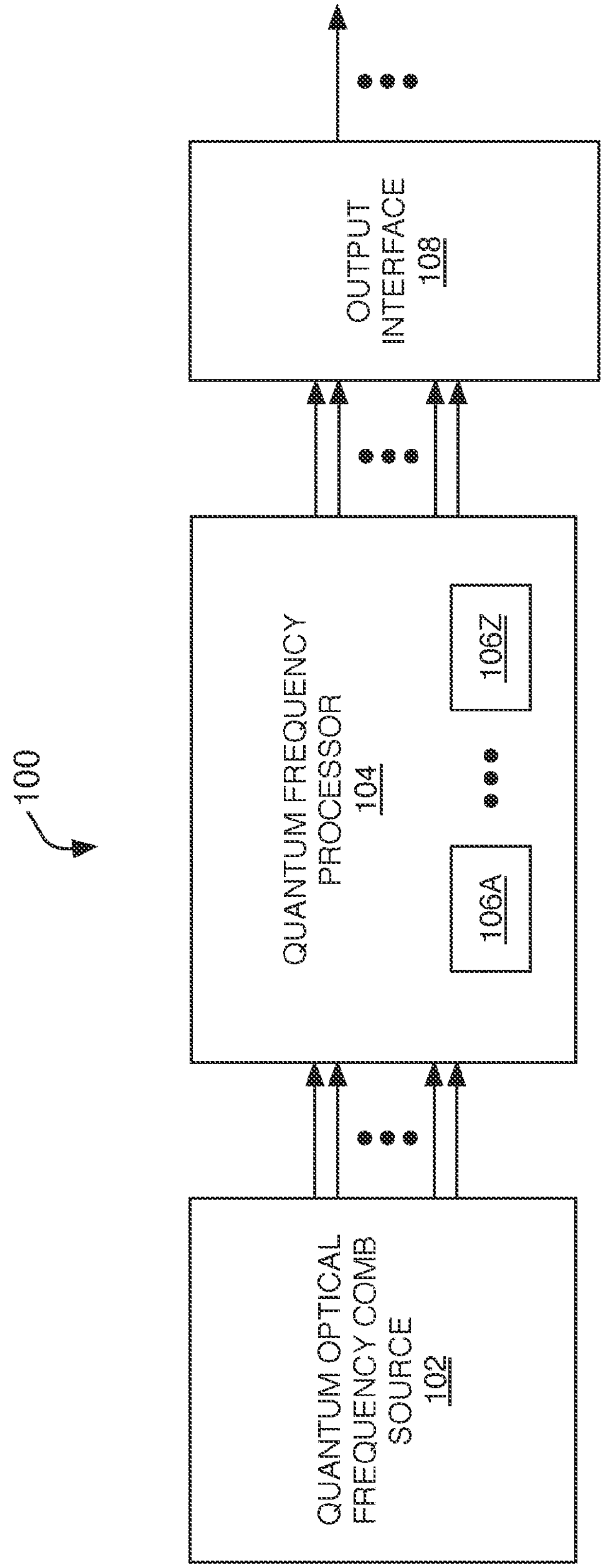
FIG. 1 is a schematic diagram of an example non-Gaussian quantum state generation system.

FIG. 1 shows an example non-Gaussian quantum state generation system 100 for generating a non-Gaussian quantum state associated with one or more spectral modes. The system 100 includes a quantum optical frequency comb source 102 comprising at least one nonlinear optical medium and configured to provide a plurality of spectral modes spaced at a frequency-bin spacing (e.g., a free spectral range of an optical parametric oscillator that includes the nonlinear optical medium). In some implementations, the spectral modes include multiple pairs of entangled spectral modes. In such implementations, each pair of entangled spectral modes includes: a first spectral mode centered at a first frequency, and a second spectral mode entangled with the first spectral mode and centered at a second frequency that is spaced from the first frequency at a multiple of the frequency-bin spacing. The system 100 includes a module 104 called a "quantum frequency processor," which includes multiple electrically controllable optical transformation modules connected in series. The module 104 includes a first module 106A in the series receiving spectral modes from the quantum optical frequency comb source 102, and a last module 106Z in the series coupled to an output interface 108. The modules in the series are not necessarily all identical. For example, the first and/or last module may include a subset of the sub-components of the other modules. In this example, two or more of the modules each include: a spectral mode phase shifter configured to apply respective phase shifts to different spectral modes based on at least a first electrical signal, and a spectral mode mixer coupled to the spectral mode phase shifter and configured to couple spectral modes centered at different frequencies based on at least a second electrical signal. The output interface 108 may include, or couple to, a wavelength-dependent element. The wavelength dependent element could be dispersive (e.g., a waveguide or a prism) or diffractive (e.g., a grating). The wavelength-dependent element can be used to spatially separate the spectral modes based upon their frequency, allowing for PNR detection of each spectral mode.

The distinction between discrete-variable (DV) and continuous-variable (CV) encodings offers a valuable lens through which to classify and understand photonic quantum information processing systems. Quantum information encoded on quantum states of optical waves can use DV encoding where a physical observable has one of multiple possible discrete values, or CV encoding where a physical observable has a value in a continuous range. Based on true (or approximate) finite-dimensional Hilbert spaces, DV optical designs are typically associated with qubits (or qudits) encoded in photons that are manipulated and subsequently measured with single-photon detectors. On the other hand, the infinite-dimensional Hilbert spaces of CV quantum information exploit collective photonic excitations (such as coherent or squeezed states) and homodyne/heterodyne detection with local oscillators (CV maintaining measurement techniques) and/or photon number resolving detectors (a measurement that can be used to convert CV into DV encoding), as fundamental resources. Gaussian states are an example of CV encoding and can be simpler to generate, compared to some realizations of DV encoding, which are non-Gaussian. The non-Gaussian quantum state generation techniques described herein can transform a Gaussian state input into a DV encoded output state. Other techniques have assumed that DV encoded states may be readily available as input states, which due to a variety of factors associated with practical implementations, is not always true. Thus, the ability to generate DV encoded states from CV encoded Gaussian states can be advantageous. From a technical side, the DV/CV divide can prove quite stark, and significant differences appear theoretically as well: for example, security proofs for CV quantum key distribution have generally proven much more challenging to establish due to the infinite dimensionality involved.

Yet this dichotomy is far from absolute, with features of particular quantum information processing approaches blurring the CV/DV distinction entirely. At the implementation level, many DV photonic systems utilize subspaces taken from a larger, intrinsically continuous Hilbert space-time and frequency bins forming representative examples of relevance. For encodings such as the Gottesman-Kitaev-Preskill (GKP) qubit, the logical quantum information is discrete, but the encoding occupies the full continuous Hilbert space. Here the CV aspects are not incidental features of the chosen Hilbert space; rather, they prove critical to the paradigm itself, providing the foundation for measuring and correcting continuous errors on the logical qubit state.

The potential of error-corrected photonic quantum information processing with GKP qubits makes them an appealing direction for research. But producing such states—and non-Gaussian CV states more generally—can be challenging. In some of the examples described herein, the frequency-bin degree of freedom (DoF) can exhibit several attractive features for scalable photonic quantum information processing, including wavelength parallelizability, compatibility with single-mode optical fiber, and CV state production with resonant parametric oscillators, both free-space and integrated.

A potential challenge of non-Gaussian state production with frequency-bin encoding, however, is the realization of arbitrary unitary operations. A quantum frequency processor (QFP) based on alternating applications of electro-optic phase modulators (EOMs) and pulse shapers can in principle synthesize any unitary frequency-bin operation in a scalable fashion.

Some of the prophetic examples described herein are based on simulation of a model for non-Gaussian frequency-bin state engineering on the QFP. We describe a resource-efficient method for computing the output of a QFP excited by Gaussian inputs and measured with photon-number-resolving (PNR) detectors applied to a subset of frequency modes. As examples of this general approach, we describe implementations of QFP circuits intended to produce Schrödinger cat states in one undetected bin and explore the impact of the number of components and ancilla modes on circuit performance, according to a cost function that balances both state fidelity and success probability. Some of the example implementations described herein can provide a general framework for non-Gaussian state production in frequency-bin quantum systems.

Without intending to be bound by theory, as an example of modeling such a system, we use a representation of Gaussian states in the coherent basis according to the K-function formalism. It has been shown that any N-mode pure Gaussian state $|\Psi\rangle$ with covariance matrix (CM) V and displacement vector $\vec{x}\beta$ can be written in the coherent basis $|\vec{\alpha}\rangle$ as $$|\Psi\rangle = \int d^{2N}\vec{x}_\alpha K(\vec{x}_\alpha)|\vec{\alpha}\rangle, \tag{1}$$

where $$K(\vec{x}_\alpha) = \frac{e^{-\frac{1}{2}(\vec{x}_\alpha-\vec{x}_\beta)^T \mathcal{B}(\vec{x}_\alpha-\vec{x}_\beta)+\frac{1}{2}\vec{x}_\alpha^T \mathcal{Y}\vec{x}_\beta}}{(2\pi)^N(\det\Gamma)^{1/4}}, \tag{2}$$

with $\Gamma = V + I/2$, $$\mathcal{B} = \frac{1}{2}\begin{pmatrix} A+\frac{i}{2}(C+C^T) & C-\frac{i}{2}(A-B) \\ C^T-\frac{i}{2}(A-B) & B-\frac{i}{2}(C+C^T) \end{pmatrix}, \tag{3}$$

$$\mathcal{Y} = \begin{pmatrix} 0 & iI \\ -iI & 0 \end{pmatrix}, \tag{4}$$

where $A = A^T$, $B = B^T$,

-continued and $C$ are defined as the blocks of $\Gamma^{-1}$ as follows:

$$\Gamma^{-1} = \begin{pmatrix} A & C \\ C^T & B \end{pmatrix}. \tag{5}$$

We note that since the CM V is symmetric, Γ and $\Gamma^{-1}$ are also symmetric. We work with the convention $\hbar=1$ (therefore the CM of vacuum is I/2) and consider the qqpp representation where vectors are defined as $$\vec{x}_\alpha^T = (\vec{q}_\alpha^T, \vec{p}_\alpha^T)$$

with $$\vec{q}_\alpha^T = (q_{\alpha_1}, \dots, q_{\alpha_N})$$

and $$\vec{p}_\alpha^T = (p_{\alpha_1}, \dots, p_{\alpha_N})$$

the canonical position and momentum vectors. The volume element for integration is then defined as $$d^{2N}\vec{x}_\alpha = dq_{\alpha_1} \dots dq_{\alpha_N} dp_{\alpha_1} \dots dp_{\alpha_N},$$

and $\alpha_i=(q_{\alpha_i}+ip_{\alpha_i})/\sqrt{2}$.

The coherent basis representation is a valuable tool for working on photon-subtraction-based or, more generally, partial PNR detection schemes aimed at engineering Gaussian states into desired non-Gaussian states. Photon subtraction can be modelled either (i) as a beamsplitter whose two input ports are fed with the ith mode of $|\Psi\rangle$ and vacuum $|0\rangle$, respectively, followed by PNR detection on the lower output port; or (ii) simply by acting the annihilation operator $\hat{a}_i$, where the index i refers to the mode, on $|\Psi\rangle$. Therefore, the photon subtraction operator will act only on the basis vectors of the state, i.e., coherent states in this instance. The action of beamsplitters or annihilation operators on coherent states is straightforward, making this basis particularly efficient for analytical or numerical evaluation. The situation is similar for partial PNR detection on a Gaussian state written as a coherent state expansion; the projection of a coherent state on a Fock state is the well known expression $$\langle n \mid \alpha\rangle = \exp(-|\alpha|^2/2)\alpha^n/\sqrt{n!}.$$

The probability of a length-N PNR pattern for an N-mode Gaussian state $|\Psi\rangle$ with zero displacements, i.e., $\vec{x}_\beta=0$ in Eq. (1), is given by $$P_{n_1 \dots n_N} = |\langle n_1 \dots n_N \mid \Psi\rangle|^2 \tag{6}$$

-continued $$= \frac{1}{\det\mathcal{H}\sqrt{\det\Gamma}\prod_{i=1}^{N} n_i!\, 2^{n_i}} |I_{n_1 \dots n_N}|^2,$$

where $$I_{n_1 \dots n_N} = \int d^{2N}\vec{x}_\alpha R(\vec{x}_\alpha) \prod_{i=1}^{N} (q_{\alpha_i} + ip_{\alpha_i})^{n_i}, \tag{7}$$

$$R(\vec{x}_\alpha) = \frac{\sqrt{\det\mathcal{H}}}{(2\pi)^N} e^{-\frac{1}{2}\vec{x}_\alpha^T \mathcal{H} \vec{x}_\alpha}, \tag{8}$$

and $\mathcal{H} = \mathcal{B} + I/2$. Equation (7) can be rewritten as $$I_{n_1 \dots n_N} = \begin{cases} 0 & \sum = \text{odd}, \\ Hf(\sigma) & \sum = \text{even}, \end{cases} \tag{9}$$

where $$\sum = \sum_{i=1}^{N} n_i,\ Hf(\sigma)$$

is the loop hafnian of the matrix σ with elements $\sigma_{ij}=\langle s_i s_j\rangle$, where $1\le i,\ j\le\Sigma$ and $s_i=q_{\alpha_i}+ip_{\alpha_i}$. The hafnian in Eq. (9) represents the mean value $$\langle s_1^{n_1} \dots s_N^{n_N}\rangle$$

under the Gaussian distribution of Eq. (8).

We will derive the explicit relation of the matrix σ to the matrix $\mathcal{H}^{-1}$ and consequently to matrices Γ and V. We also give the expressions for the Fock expansion coefficients of the produced non-Gaussian states and simplify further the expressions.

The matrix Γ is defined as Γ=V+I/2, where V is the CM and I the identity matrix. Since V corresponds to a pure Gaussian state, it can be written as $$V = S_p V_0 S_p^T,$$

where $S_p$ is an orthogonal symplectic matrix for a general passive transformation (beamsplitters and phase rotations, but not squeezers) and $V_0$ is the CM for a product of N single mode squeezed vacuum states, i.e., the diagonal matrix $$V_0 = \frac{1}{2}\operatorname{diag}(e^{2r_1}, \dots, e^{2r_N}, e^{-2r_1}, \dots, e^{-2r_N}), \tag{10}$$

where $r_1, \dots, r_N$ are the real and positive squeezing parameters for each of the N single-mode squeezed vacuum states (note that the phase of the squeezing has been absorbed into the orthogonal symplectic transformation $S_p$).

We have the following relation, $$\det\Gamma = \det\left[S_p\left(V_0 + \frac{I}{2}\right)S_p^T\right] \tag{11}$$

$$= \det S_p \det\left(V_0 + \frac{I}{2}\right)\det S_p^T, \tag{12}$$

-continued from which we write $$\det\Gamma = \det\left(V_0 + \frac{I}{2}\right) \tag{13}$$

since $$\det S_p = \det S_p^T = 1$$

as both $S_p$ and $$S_p^T$$

are symplectic matrices. The right hand side of Eq. (13) is the determinant of a diagonal matrix from which we find $$\det\Gamma = \prod_{i=1}^{N} \cosh^2 r_i. \tag{14}$$

Therefore, Eq. (6) is rewritten as $$P_{n_1 \ldots n_N} = \frac{|I_{n_1 \ldots n_N}|^2}{\det\mathcal{H}\prod_{i=1}^{N} n_i!\, 2^{n_i} \cosh r_i}. \tag{15}$$

In the case where the input squeezing is the same among all single mode squeezed vacuum states, i.e. $r_1 = \ldots = r_N = r$, Eq. (14) reduces to $\det\Gamma = \cosh^{2N} r$.

In order to simplify Eq. (5) we can write $$\Gamma = S_p(V_0 + I/2)S_P^T$$

and since $$S_p^{T^{-1}} = S_p$$

is a symplectic orthogonal matrix we have $$\Gamma^{-1} = S_p\left(V_0 + \frac{1}{2}\right)^{-1} S_p^T. \tag{16}$$

The symplectic orthogonal matrix $S_p$ has the following block matrix structure and properties:

$$S_p = \begin{pmatrix} S_A & S_B \\ -S_B & S_A \end{pmatrix} \tag{17}$$

$$S_A^T S_B = S_B^T S_A, \tag{18}$$

$$S_A S_B^T = S_B S_A^T, \tag{19}$$

$$S_A^T S_A + S_B^T S_B = I, \tag{20}$$

-continued $$S_A S_A^T + S_B S_B^T = I. \tag{21}$$

Moreover, since $V_0$ is diagonal we can write $$\left(V_0 + \frac{1}{2}\right)^{-1} = I + \begin{pmatrix} -T & 0 \\ 0 & T \end{pmatrix}, \tag{22}$$

where $T = \mathrm{diag}(\tanh r_1, \ldots, \tanh r_N)$. In virtue of Eqs. (16), (17), and (19), we find that in Eq. (5)

$$A = -S_A T S_A^T + S_B T S_B^T, \tag{23}$$

$$C = C^T = S_A T S_B^T + S_B T S_A^T, \tag{24}$$

$$A + B = 2I. \tag{25}$$

Therefore, in the most general case possible, Eq. (5) is simplified to $$\Gamma^{-1} = \begin{pmatrix} A & C \\ C & 2I - A, \end{pmatrix} \tag{26}$$

where A and C are given in Eqs. (23) and (24), respectively, as functions of the passive symplectic transformation $S_p$ and the input squeezing parameters.

Consequently, matrix $\mathcal{B}$ of Eq. (3) simplifies to $$\mathcal{B} = \frac{1}{2}\begin{pmatrix} A + iC & C - i(A - I) \\ C - i(A - I) & 2I - A - iC \end{pmatrix}. \tag{27}$$

The matrix $\mathcal{H}$ appearing in Eq. (8) is defined as $$\mathcal{H} = \mathcal{B} + I/2. \tag{28}$$

We find it easier if we transform as $\tilde{\mathcal{H}} = W^\dagger \mathcal{H} W$ using the unitary matrix W defined as $$W = \frac{1}{\sqrt{2}}\begin{pmatrix} I & I \\ -iI & iI \end{pmatrix}. \tag{29}$$

Utilizing Eqs. (27), (28), and (29) we find $$\tilde{\mathcal{H}} = \begin{pmatrix} I & A - I + iC \\ 0 & I \end{pmatrix}, \tag{30}$$

from which we see that $\det\tilde{\mathcal{H}} = \det I = 1$. Since $|\det W|^2 = 1$, we have $\det\tilde{\mathcal{H}} = \det\mathcal{H}$ and conclude that $$\det\mathcal{H} = 1. \tag{31}$$

Therefore, Eqs. (8) and (15) are further simplified to $$P_{n_1 \ldots n_N} = \frac{|I_{n_1 \ldots n_N}|^2}{\prod_{i=1}^{N} n_i!\, 2^{n_i} \cosh r_i}, \tag{32}$$

$$R(\vec{x}_\alpha) = \frac{1}{(2\pi)^N} e^{-\frac{1}{2}\vec{x}_\alpha^T \mathcal{H} \vec{x}_\alpha}. \tag{33}$$

In order to derive a convenient expression for $\mathcal{H}^{-1}$, we work with $\tilde{\mathcal{H}}$ and observe that $$\tilde{\mathcal{H}}^{-1} = \begin{pmatrix} I & -(A - I + iC) \\ 0 & I \end{pmatrix} \tag{34}$$

is indeed the inverse of $\tilde{\mathcal{H}}$, i.e., it satisfies $\tilde{\mathcal{H}}\tilde{\mathcal{H}}^{-1}=1$. Since $\tilde{\mathcal{H}}=W^\dagger \mathcal{H} W$ we find that $\mathcal{H}^{-1}=W\tilde{\mathcal{H}}^{-1}W^\dagger$ and finally $$\mathcal{H}^{-1} = \frac{1}{2}\begin{pmatrix} 3I - A - iC & i(A - I + iC) \\ i(A - I + iC) & I + A + iC \end{pmatrix}. \tag{35}$$

Therefore, using Eqs. (23), (24), and (35), any given passive symplectic transformation $S_p$, and input squeezing parameters, one can readily write $\mathcal{H}^{-1}$.

Making use of Eq. (33), we can express the matrix elements of σ as $$\sigma_{ij} = \langle (q_{\alpha_i} + ip_{\alpha_i})(q_{\alpha_j} + ip_{\alpha_j}) \rangle = \frac{1}{(2\pi)^N}\int d^{2N}\vec{x}_\alpha \exp\left(-\frac{1}{2}\vec{x}_\alpha^T \mathcal{H}\vec{x}_\alpha\right) \times (q_{\alpha_i} + ip_{\alpha_i})(q_{\alpha_j} + ip_{\alpha_j}) = \frac{d}{d\lambda_i}\frac{d}{d\lambda_j}\exp\left(\frac{1}{2}\vec{\Lambda}^T \mathcal{H}^{-1}\vec{\Lambda}\right)\Big|_{\vec{\lambda}=\vec{0}}, \tag{36}$$

where $$\vec{\Lambda}^T = (\vec{\lambda}^T, i\vec{\lambda}^T)$$

is a 2N-dimensional vector with $\vec{\lambda}^T=(\lambda_1, \ldots, \lambda_N)$ a real N-dimensional vector. Viewing $$\frac{1}{2}\vec{\Lambda}^T \mathcal{H}^{-1}\vec{\Lambda}$$

in the exponential of the right hand side of Eq. (36) as a polynomial in $\lambda_i$, Eq. (36) is equal to the coefficient of $\lambda_i\lambda_j$. This way, we can write $$\sigma_{ij} = 2(\mathcal{H}^{-1}_{ij} - \mathcal{H}^{-1}_{i+N\, j+N}). \tag{37}$$

From the covariance matrix V, one can find matrix $\Gamma^{-1}$ and therefore matrix σ using Eqs. (35) and (37), which is used in the calculation in Eq. (9).

Figure 2:
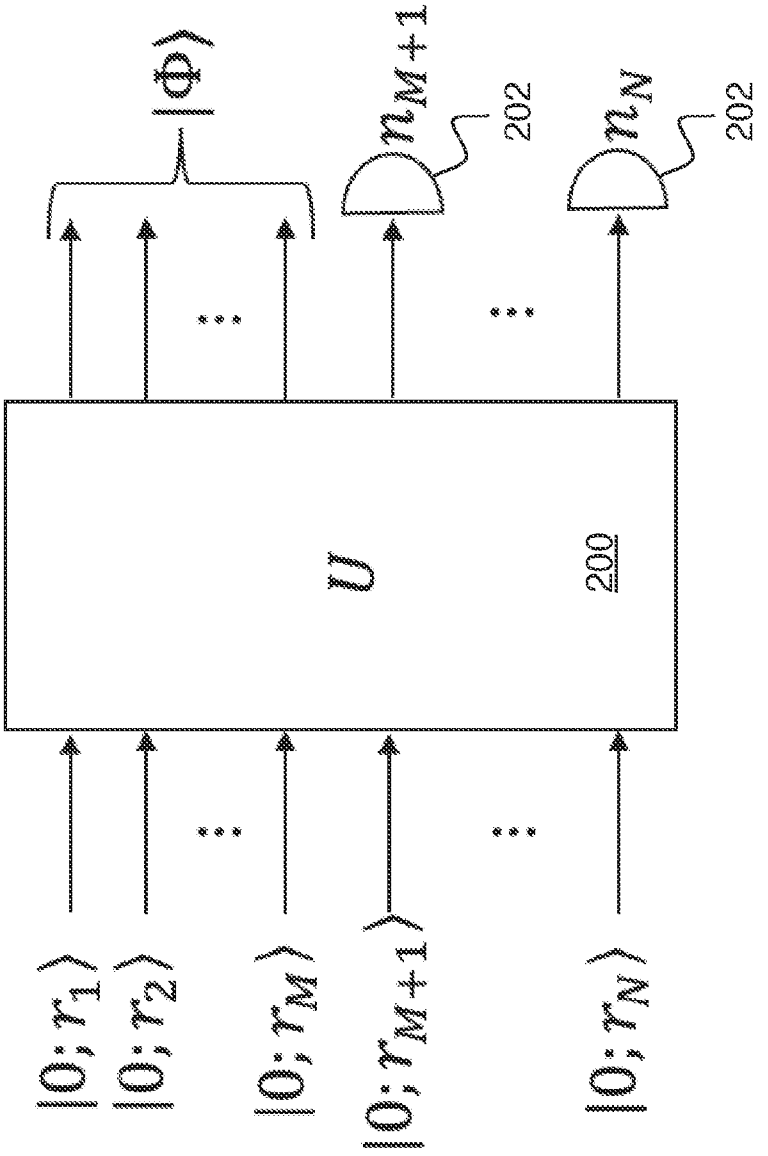
FIG. 2 is a schematic diagram of an example generation scheme for heralded non-Gaussian states.

The Gaussian moment problem of Eq. (7) represents a hafnian calculation and is related to the Gaussian boson sampling paradigm. When the indices i, j are equal this corresponds to a loop, i.e., matching an object with itself. Therefore, it is typically referred to as a loop hafnian. Equation (32) is the probability of finding $n_i$ photons in each one of the i=1, . . . , N modes. If we wish to engineer the N-mode Gaussian state into an M-mode (M<N) non-Gaussian, one as shown in FIG. 2, we leave M modes undetected; without loss of generality we assume the undetected modes are the M upper modes. The probability of the PNR pattern $(n_{M+1}, \ldots, n_N)$ on the lower detected modes is precisely the probability $P_{n_{M+1}, \ldots, n_N}$ of producing the corresponding non-Gaussian state. This probability is $$P \equiv P_{n_{M+1},\ldots,n_N} = \sum_{n_1,\ldots,n_M=0}^{\infty} P_{n_1,\ldots,n_N}. \tag{38}$$

For numerical simulations, the above sum is truncated to a finite upper limit, which should be chosen with care to ensure that it encompasses all Fock coefficients of nonnegligible probability. This condition can be verified in practice by successively increasing the limits and observing no change to P.

FIG. 2 shows an example system 200 configured for heralding an M-mode state $|\Phi\rangle$ from N single-mode, zero-displacement squeezed resource states and N×N unitary operation U. Partial PNR detection on the N−M lower modes by photodetectors 202, each configured as a PNR detector to distinguish among different numbers of detected photons, produces a non-Gaussian state on the undetected M modes. For example, a PNR detector can be implemented using detectors incorporating cryogenic sensors, and/or superconducting materials. One example of a PNR detector is a transition-edge sensor (TES). Another example of a PNR detector is a segmented detector based on single-photon avalanche-photodiodes.

In some implementations of a PNR detector, the PNR detector can be configured to be able to distinguish a detected photon number equal to zero from a detected photon number equal to one, in each of a plurality of time slots, and to also be able to distinguish a detected photon number equal to N from a detected photon number of N+1, in each of the plurality of time slots, for each value of N up to at least some relatively large number (e.g., N at least 10 or greater). In some cases, it may not be necessary for the PNR detector to be able to distinguish any possible number of detected photons from any other possible number of detected photons. For example, for a particular system configuration, it may only be necessary to distinguish among photon numbers that are more likely to be detected.

The non-Gaussian state $|\Phi\rangle$ on the M undetected modes can be written as a partial projection on Fock states of the detected modes:

$$|\Phi\rangle = \frac{1}{\sqrt{P}}\langle n_{M+1} \ldots n_N | \Psi\rangle, \tag{39}$$

where P is given in Eq. (38) and $|\Psi\rangle$ is the input N-mode Gaussian state.

The Fock expansion coefficients of heralded state $|\Phi\rangle$ are $c_{n_1 \ldots n_M}=\langle n_1 \ldots n_M|\Phi\rangle$. Using Eqs. (7) and (39) we find $$c_{n_1 \ldots n_M} = \frac{I_{n_1 \ldots n_M n_{M+1} \ldots n_N}}{\sqrt{P} \prod_{i=1}^{N} \sqrt{n_i! 2^{n_i}} \cosh r_i}, \tag{40}$$

where the numerator is given by Eq. (7). Therefore, for any given partial PNR pattern ($n_{M+1}, \ldots, n_N$) one can compute the Fock expansion coefficients of the produced state $|\Phi\rangle$, which can be benchmarked against a target non-Gaussian state $|\Phi_t\rangle$ through direct comparison of Fock coefficients or collectively through fidelity $\mathcal{F} = |\langle \Phi_t | \Phi \rangle|^2$.

Regarding the example model framework thus far described, we note the following. First, we note that our formalism provides an approach to computing Gaussian states in the Fock basis. By incorporating the reduced dimensionality of a pure state directly, our approach may call for calculation of fewer expansion coefficients to fully characterize the output, in the case of pure state evolution.

Second, extra care may be needed when dealing with loop hafnians. Let us give an example. Say that one wants to calculate $$\langle s_1^2 s_2 s_3 \rangle$$

To apply Wick's formula for implementing a practical application of the modeled system, one may rewrite the mean value as containing four different objects, i.e., $$\langle s_1^2 s_2 s_3 \rangle = \langle g_1 g_2 g_3 g_4 \rangle.$$

Wick's formula gives the computed matchings as $\langle g_1 g_2 g_3 g_4 \rangle = \langle g_1 g_2 \rangle \langle g_3 g_4 \rangle + \langle g_1 g_3 \rangle \langle g_2 g_4 \rangle + \langle g_1 g_4 \rangle \langle g_2 g_3 \rangle$, and then we substitute back $g_1 = g_2 = s_1$, $g_3 = s_2$, and $g_4 = s_3$, which gives $$\langle s_1^2 s_2 s_3 \rangle = \langle s_1^2 \rangle \langle s_2 s_3 \rangle + \langle s_1 s_2 \rangle \langle s_1 s_3 \rangle + \langle s_1 s_3 \rangle \langle s_1 s_2 \rangle.$$

For the calculation of loop hafnians, we give a formula which is the nonzero result of Eq. (9):

$$Hf(\sigma) = \frac{1}{\left(\frac{\Sigma}{2}\right)!} \sum_{v_1=0}^{n_1} \cdots \sum_{v_N=0}^{n_N} (-1)^{v_1 + \ldots + v_N} \times \binom{n_1}{v_1} \cdots \binom{n_N}{v_N} \left(\frac{1}{2} \vec{h}^T \sigma \vec{h}\right)^{\frac{\Sigma}{2}} \tag{41}$$

where $\vec{h}^T = (n_1/2 - v_1, \ldots, n_N/2 - v_N)$. Equations (7) and (41) can be used directly in Eq. (38) for the probability of finding any non-Gaussian state in the undetected modes and in Eq. (40) for the Fock expansion coefficients of such a state. This tailored expression for the loop hafnian may provide significant computational speed up for non-Gaussian state engineering work. Essentially, the improvement can be obtained when the dominant bottleneck in Wick's formula stems from repeated factors (e.g., $s_1$ in the example above) rather than many non-repeated factors, (e.g., $s_2$ and $s_3$ in the example above).

Third and finally, the formulas above enable calculation of the coefficients $\langle n_1 \ldots n_N | \Psi \rangle$ for any diagonal input covariance matrix $V_0$ and passive symplectic mode transformation $S_p$—i.e., any covariance matrix for a pure Gaussian state—without numerical evaluation of a single matrix inverse or determinant: these expressions have all been reduced to matrix or scalar operations in the above examples. This simplification has an impact on the efficiency of the numerical procedure, eliminating potentially time-consuming inverse calculations from the optimization loop.

Up to this point, the mathematical formulation has been general with respect to the underlying optical modes, applicable equally well to any photonic DoF. We now refine our focus to frequency bins specifically. Fundamentally, the QFP is designed to realize arbitrary unitary operations on a discrete set of equispaced, clearly separated frequency modes, or bins.

In order to understand the basic principles of operation, consider a discrete set of frequency modes, each centered at $\omega_n = \omega_0 + n\Delta\omega (n \in \mathbb{Z})$ and associated with an annihilation operator $\hat{a}_n$. The corresponding output operators $\hat{b}_n$ relate to the inputs $\hat{a}_n$ as $$\hat{b}_n = e^{i\phi_n} \hat{a}_n \tag{42}$$

for a line-by-line pulse shaper and $$\hat{b}_n = \sum_{k=-\infty}^{\infty} f_{n-k} \hat{a}_k \tag{43}$$

for an EOM driven with phase function $\varphi(t)$ periodic at the inverse mode spacing $$T = \frac{2\pi}{\Delta\omega},$$

so that $$e^{i\varphi(t)} = \sum_n f_n e^{-in\Delta\omega t} \text{ and } f_n = \frac{1}{T} \int_0^T dt\, e^{i\varphi(t)} e^{in\Delta\omega t}.$$

As written, this formulation contains an infinite number of frequency bins; in the interests of numerical tractability, though, we can limit the total number of considered modes to N and discretize the temporal period as $$t_n = \frac{nT}{N}$$

($n \in \{0, 1, \ldots, N-1\}$). Under this approximation, the total N×N unitary for a sequence of Q components becomes $$U = (FD_Q F^\dagger) D_{Q-1} \ldots (FD_3 F^\dagger) D_2 (FD_1 F^\dagger), \tag{44}$$

where F is the discrete Fourier transform with elements $$F_{mn} = \frac{1}{\sqrt{N}} e^{2\pi imn/N}$$

($m,n \in \{0, 1, \ldots, N-1\}$). Each $D_q$ is a diagonal unitary matrix; the odd-numbered q signify an EOM with elements $$(D_q)_{nn} = e^{i\varphi^{(q)}(t_n)},$$

and the even-numbered q a pulse shaper with $$(D_q)_{nn} = e^{i\phi_n^{(q)}}.$$

We bookend the QFP with EOMs in our example, rather than pulse shapers, based on previous experience where we have observed no increase in circuit performance with the addition of a front- or back-end pulse shaper. The form in Eq. (44) accurately reflects the physical situation as long as N is sufficiently large so that photon probability amplitudes do not reach the edge of the truncated simulated domain and artificially "wrap around" to the other side; in practice, this situation can be avoided by limiting the maximum EOM modulation index or applying bandpass filters to the pulse shaper matrices.

Diagonal unitary decompositions in the form of Eq. (44) can be used in a variety of photonic DoFs, including position/momentum, parallel waveguides, and time bins-whenever the physical system can be modeled as the application of phase shifts in alternating Fourier-transform pairs. One can analytically design such systems by starting with the beamsplitter/phase-shifter decomposition of path encoding, and then expressing each beamsplitter layer as six alternating phase masks, for example. However, this may introduce significant resource overhead, which may present a challenge to computing the $D_q$ matrix elements used to synthesize a desired target matrix U optimally—i.e., without an intermediate conversion step to an equivalent path circuit. Accordingly, numerical optimization can be used in some QFP implementations for basic gates such as the Hadamard, controlled-NOT, cyclic hop, and arbitrary single-qubit unitaries. In some examples described herein, the non-Gaussian CV cases considered deal with many-photon states inherently.

Figure 3A:
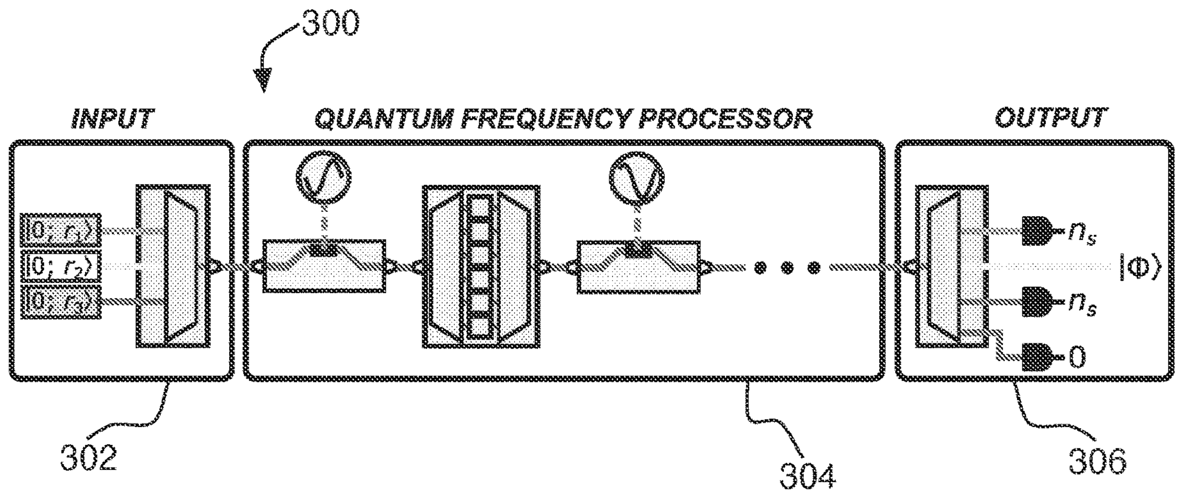
FIG. 3A is a schematic diagram of an example non-Gaussian quantum state generation system.
Figure 3B:
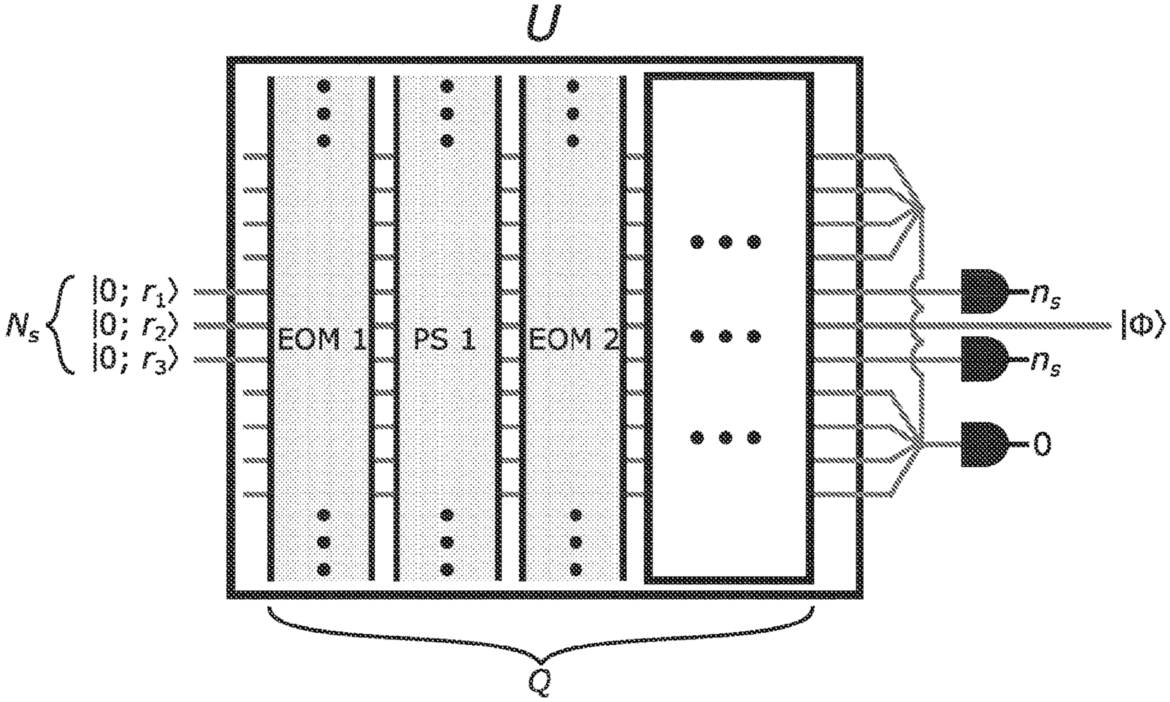
FIG. 3B is a schematic diagram of an example non-Gaussian quantum state generation system.

FIG. 3A and FIG. 3B provide an overview of an example non-Gaussian state engineering system. The case of $N_s=3$ input squeezed modes is shown for concreteness. FIG. 3A shows a schematic view of an example system 300, where squeezed states in distinct frequency modes from an input module 302 traverse the sequence of EOMs and pulse shapers in a QFP module 304, which is connected to an output module 306. In this example, the condition for successful heralding is the detection of $n_s$ photons each in all but one of the central $N_s$ bins and zero photons in all adjacent bins. The undetected mode is left in state $|\Phi\rangle$. FIG. 3B shows a schematic view of the logic of system 300, represented by a transformation U, where each rail denotes an individual frequency bin, with the QFP functioning as a complex interferometer. As previously mentioned, our mathematical formalism applies to a system like FIG. 3A where the M undetected modes can be any of the total N modes without loss of generality. In the following example we choose M=1 and select this single undetected mode as the Kth mode, which is at the center of a set of $N_s$ modes that are populated with single-mode squeezed vacuum states at the input; the remaining $N-N_s$ modes are initially vacuum. For our simulations, we take the phase of the squeezing to be zero for all cases, although incorporating non-zero phases is possible in alternative examples. After application of U, the Kth mode is left undetected and $n_s$ photons are detected in each of the other central $N_s-1$ modes. Production of the desired state in the Kth mode is heralded by simultaneously detecting vacuum in the remaining $N-N_s$ modes: in essence, a bucket detector for all remaining modes. The use of such vacuum postselection is a consequence of the presence of an infinite set of ancilla modes in the frequency-bin DoF, which can be detected to ensure that the output state is pure.

Given the massive design space available for non-Gaussian QFP circuits—in terms of input states, unitaries, and output patterns—we have attempted in the specific configuration of FIG. 3A to provide a relatively simple example that nevertheless retains key features anticipated for successful circuits. By placing the output mode of interest in the center of the squeezed inputs, we increase opportunities for multiphoton interference with relatively weak modulation amplitudes, and selecting from the modes initially populated with photons for PNR detection with $n_s>0$ should permit reasonable success probabilities.

The use of PNR detection in the output module 306 after the QFP module 304 allows us to attain non-Gaussian states that are not available within other Gaussian cluster state models. In some alternative implementations, a GKP qubit encoding can be used that has a single photon in a discrete grid of spectro-temporal modes. While similar in that this also leverages the frequency DoF, many of the examples described herein provide for construction of non-Gaussian states in which quantum information resides in the field quadratures of optical modes, making our analysis multi- rather than single-photon in nature.

Having detailed the mathematical formalism and highlighted the specific features of the QFP, we now apply an example framework toward the design of quantum circuits that produce desired non-Gaussian output states, according to the configuration presented in FIG. 3A.

As noted previously, quantum system design with the QFP lacks an optimal analytical unitary decomposition procedure, so that numerical optimization may be used to obtain a QFP configuration realizing a desired unitary. In the context of non-Gaussian state design, the need for numerical optimization in itself is not unique, but has proven a fixture in path encoding as well.

In one approach to non-Gaussian state design, rather than designing a quantum circuit to implement some target state $\Phi_t$ directly, a Fock-truncated core state $|\Phi_{core}\rangle$ is sought instead—related to $|\Phi_t\rangle$ via a squeezing and displacement operation, $|\Phi_t\rangle = S(z)D(\beta)|\Phi_{core}\rangle$. Suppose that the mode unitary found to produce $|\Phi_{core}\rangle$ is U; then, by absorbing the displacement and squeezing operation into a new set of inputs and mode unitary U', an interferometer for the desired full state $|\Phi_t\rangle$ can be produced immediately via an analytical decomposition scheme. In the QFP case, however, if a set of EOM and pulse shaper solutions are found that can implement the core state preparation circuit U, there is no straightforward connection from it [i.e., the $D_q$ matrices in Eq. (44)] to the modified configuration that would realize U'; instead, numerical optimization may be employed on U', effectively doubling the rounds of numerical design compared to path encoding. In what follows we concentrate on synthesizing circuits that produce the full target state $|\Phi_t\rangle$ immediately, avoiding this intermediate core state step.

To begin the optimization process we first define the target state $|\Phi_t\rangle$ in the Fock basis, i.e., the coefficients $\langle_n = \langle n|\Phi_t\rangle$. We employ MATLAB's particle swarm optimization (PSO) tool to find the $N_s$ nonzero input squeezing values of the total length-N vector of inputs $$\vec{r} = \left(0, \ldots, 0, r_{K-\lfloor\frac{N_s}{2}\rfloor}, \ldots, r_{K-1}, r_K, r_{K+1}, r_{K+\lfloor\frac{N_s}{2}\rfloor}, 0, \ldots, 0\right), \tag{45}$$

and a QFP unitary, U, that when applied to the N-mode input followed by detection of $n_s$ photons in each of the remaining $N_s-1$ squeezed modes, produces a state $|\Phi\rangle$. Letting $n_c$ denote the photon number at which we truncate the state for numerical simulations, we therefore compute a total of $n_c+1$ coefficients (including vacuum) to fully describe the heralded output. To find the optimal squeezing values and U, PSO varies the phase shifts applied to the N QFP modes by the pulse shapers, each EOM's phase modulation function φ(t), and the $N_s$ nonzero elements of $\vec{r}$ in order to minimize the cost function $$C = P\log_{10}(1-\mathcal{F}), \tag{46}$$

where $\mathcal{F}$ and P are the fidelity of $|\Phi\rangle$ with respect to $|\Phi_t\rangle$ and the probability of producing $|\Phi\rangle$, respectively. We have found a logarithmic cost function of this form useful for penalizing $\mathcal{F}<1$ more strongly than $P<1$, emulating the effect of a constraint on $\mathcal{F}$ without the computational cost associated with a strict constraint function. Other cost functions may also be employed without materially altering our approach. The Fock coefficients of $|\Phi\rangle$ in the Kth mode can be expressed as Eq. (40) which we write in the form $$c_{n_K} = \frac{I_{\vec{n}}}{\sqrt{P}\prod_{i=1}^{N}\sqrt{n_i!2^{n_i}\cosh r_i}} \tag{47}$$

where $\vec{n}=(0, \ldots, 0, n_s, \ldots, n_s, n_K, n_s, \ldots, n_s, 0, \ldots, 0)$ is the vector of photon numbers over all output modes, so that P and $\mathcal{F}$ can be written as $$P = \sum_{n_K=0}^{n_c}\left(\frac{|I_{\vec{n}}|^2}{\prod_{i=1}^{N} n_i!2^{n_i}\cosh r_i}\right) \text{ and} \tag{48}$$

$$\mathcal{F} = |\langle\Phi_t|\Phi\rangle|^2 = \left|\sum_{n_K=0}^{n_c}\tau_{n_K}^* c_{n_K}\right|^2. \tag{49}$$

With the cost function defined we now lay out an example procedure for evaluating $\mathcal{F}$ and P at each PSO iteration. First, we calculate $$\left(V_0 + \frac{I}{2}\right)^{-1}$$

using $\vec{r}$ in Eq. (22). U is calculated by plugging the N phase shifts for each pulse shaper and each EOM's φ(t) into Eq. (44), which we convert to symplectic form, $S_p$, via $$S_p = W\begin{pmatrix} U & 0 \\ 0 & U^* \end{pmatrix}W^\dagger, \tag{50}$$

where W is defined by Eq. (29) and U* corresponds to element-by-element conjugation (no transpose). $\Gamma^{-1}$ is then calculated by Eq. (16), and the blocks A and $C$ extracted per Eq. (26). A and $C$ are used to find $\mathcal{H}^{-1}$ with Eq. (35). The matrix elements of σ are found by using $\mathcal{H}^{-1}$ in Eq. (37). Because we detect vacuum in all the QFP modes except for the center $N_s$, $$\vec{h}^T = \left(0, \ldots, 0, \frac{n_s}{2} - \nu_{K-\lfloor\frac{N_s}{2}\rfloor}, \ldots, \frac{n_K}{2} - \nu_K, \ldots, \frac{n_s}{2} + \nu_{K-\lfloor\frac{N_s}{2}\rfloor}, 0, \ldots, 0\right)$$

in Eq. (41) renders unimportant all the elements of σ other than the center $N_s \times N_s$ block. Therefore we proceed to evaluate Eq. (47) using only the center block of σ, for $n_K \in \{0, 1, \ldots, n_c\}$ and are left with the Fock coefficients $c_{n_K}$ of $|\Phi\rangle$.

We choose to compute $\Gamma^{-1}$ in this manner for computational reasons. As a large matrix—2N×2N in general and 128×128 in our case—Γ is time-consuming to invert. We bypass this time sink by calculating $\Gamma^{-1}$ directly with Eq. (22), rather than performing $$\Gamma = S_P V_0 S_P^T + I/2$$

and inverting Γ.

We take further action to streamline the $n_c+1$ calculations of $I_{\vec{n}}$ needed to find the Fock coefficients of $|\Phi\rangle$, dominated by Hf(σ) in Eqs. (9) and (41). σ is the only quantity in Eq. (41) that will change in the successive iterations of PSO; therefore, we can precompute a number of the elements of Eq. (41) outside the optimization loop and use them for every PSO iteration. Calculating these elements upfront proves imperative to expediting the optimization process when $n_c$ becomes large.

Consider a given value $n_K$. First, we define the length-$N_s$ vector $$\vec{s}^T = (n_s, \ldots, n_s, n_K, n_s, \ldots, n_s), \tag{51}$$

the sum of photons in the output modes $$\sum = \sum_{i=1}^{N_s} s_i = (N_s-1)n_s + n_K, \tag{52}$$

and index vectors for each mode $$\vec{v}_i^T = (0, 1, \ldots, s_i),$$

where the maximum $s_i$ for each mode is taken from Eq. (51).

Then we find all combinations of the entries of the v vectors and store them in a matrix D, where each row corresponds to a unique length-$N_s$ listing of elements, one drawn from each $\vec{v}_i$. Because we choose to detect the same number of photons, $n_s$, in the $N_s-1$ modes, D will be of dimension $(n_s+1)^{N_s-1}(n_K+1)\times N_s$ and will take on the role of the nested summations that appear in Eq. (41). We calculate the exponent of the (−1) factor in Eq. (41) for all terms of the nested summation and store them in $\vec{\mathcal{W}}$ whose elements are defined as $$\mathcal{W}_i = \sum_{j=1}^{N_s} D_{ij}. \tag{53}$$

Similarly, the product of binomials in Eq. (41) is calculated for all terms in the nested summation and stored in $\vec{X}$, $$X_i = \prod_{j=1}^{N_s} \binom{s_j}{D_{ij}}. \tag{54}$$

$\vec{h}^T$ for all the terms in the nested summation are stored in vectors $$\vec{\mathcal{Z}}_i^T = \left(\frac{s_1}{2} - D_{i1}, \ldots, \frac{s_{N_s}}{2} = D_{iN_s}\right). \tag{55}$$

The Hf(σ) calculation is then reduced to a single summation over these precomputed elements, $$Hf(\sigma) = \sum_{i=1}^{\kappa} \frac{1}{\left(\frac{\Sigma}{2}\right)!}(-1)^{\mathcal{W}_i} X_i \left(\frac{1}{2}\vec{\mathcal{Z}}_i^T \sigma \vec{\mathcal{Z}}_i\right)^{\frac{\Sigma}{2}}, \tag{56}$$

where $\kappa=(n_s+1)^{N_s-1}(n_K+1)$. This process can be repeated for all values $n_K\in\{0, 1, \ldots, n_c\}$ giving us all necessary precomputed $\vec{s}$, Σ, $\vec{W}$, $\vec{X}$, and $\vec{Z}_i$, elements.

As examples of our method, we seek to generate even Schrödinger cat states with coherent amplitudes α ranging from 0.5 to 3 in steps of 0.25. For each α value $|\Phi_t\rangle$ is therefore set to $$|\Phi_t\rangle = \frac{|\alpha\rangle + |-\alpha\rangle}{\sqrt{2\left(1 + e^{-2|\alpha|^2}\right)}}, \tag{57}$$

where $$|\pm\alpha\rangle \approx e^{-\frac{1}{2}|\pm\alpha|^2}\sum_{n=0}^{n_c}\frac{(\pm\alpha)^n}{\sqrt{n!}}|n\rangle.$$

We truncate $|\pm\alpha\rangle$ at $n_c=40$ for all α values, which encompasses all the Fock support to high precision at α=3, and therefore for any $|\Phi_t\rangle$ with α<3 as well. Indeed, the truncation error defined as $$\varepsilon_{n_c} = 1 - \sum_{n=0}^{nc}|\langle n|\Phi_t\rangle|^2$$

is less than $10^{-14}$ for α≤3 and $n_c=40$. This choice is highly conservative, as one could likely consider smaller $n_c$ values such as $n_c=20$ or 30 for added computational speed up, for which the errors remain small: $\varepsilon_{20}<10^{-3}$ and $\varepsilon_{30}<10^{-8}$ at α=3.

As an example, to make these results as tractable as possible for implementation, we limit φ(t) to a single sinewave and constrain $$\left(r_{K-\lfloor\frac{N_s}{2}\rfloor}, \ldots, r_K, \ldots, r_{K+\lfloor\frac{N_s}{2}\rfloor}\right)$$

to a maximum of 1.5 (corresponding to a squeezing value of approximately 13 dB). We proceed to optimize with Q∈{3, 5, 7} total QFP elements, N=64 QFP modes, and $N_s\in\{3,5\}$ input squeezed states, along with a 32-mode bandpass filter on each pulse shaper to prevent unphysical solutions that reach the edge of the N=64-mode truncation. The nonzero PNR detectors are set to herald on $n_s=1$, which ensures that Σ in Eq. (9) will be even when computing even Fock coefficients in the undetected mode K ($n_K\in\{0, 2, \ldots, 40\}$). The target cat state coefficients are real numbers; however, the coefficients found by optimization are in general complex. Therefore if the state found by optimization has fidelity equal to one, it should have a constant phase for all Fock coefficients.

Figure 4A:
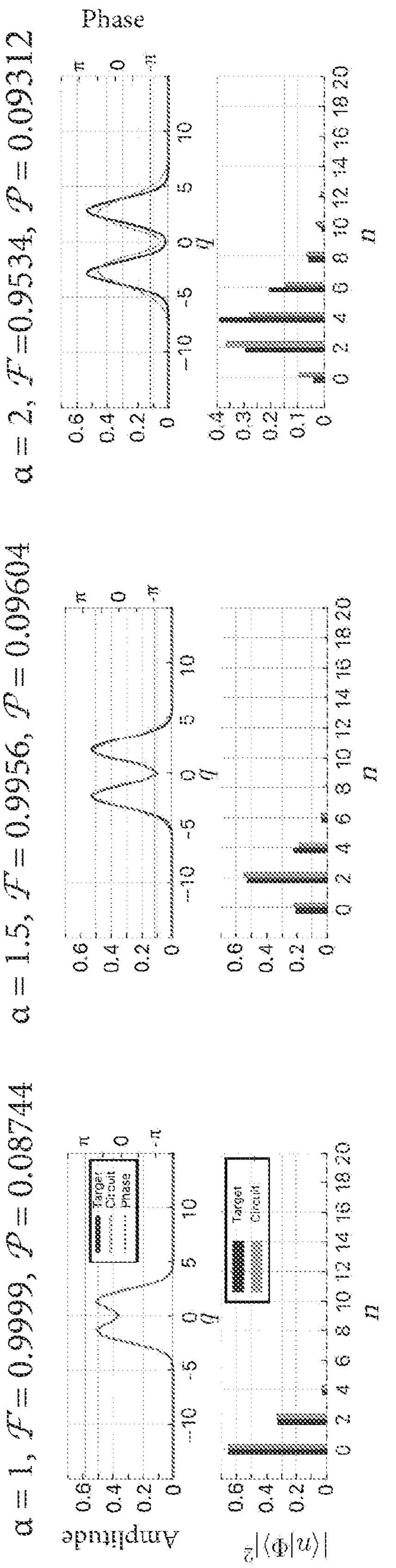
FIG. 4A is a set of plots of wavefunctions in the quadrature basis (top panels) and photon number probabilities (bottom panels) for the generation of Schrödinger cat states.
Figure 4B:
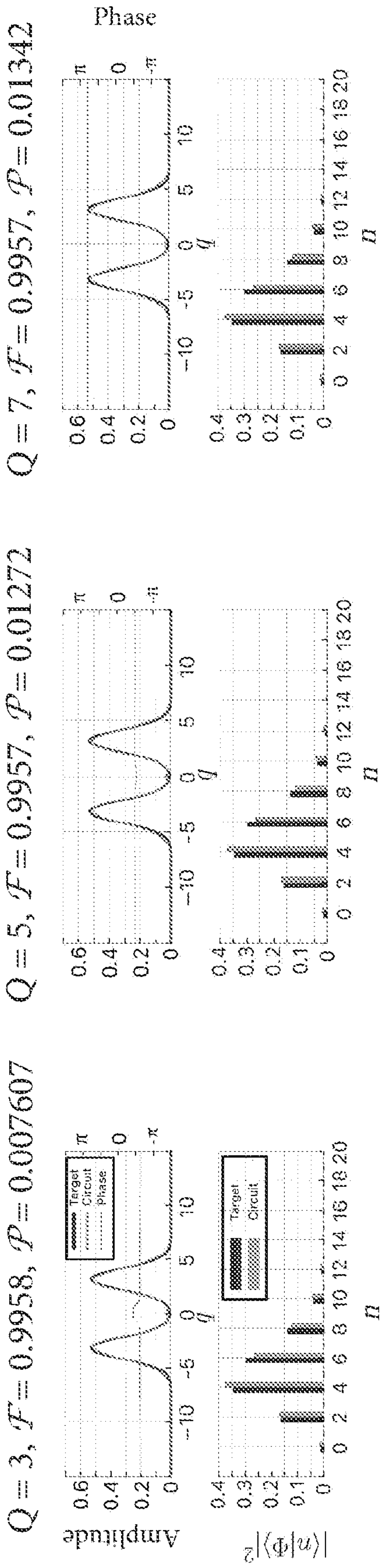
FIG. 4B is a set of plots of wavefunctions in the quadrature basis (top panels) and photon number probabilities (bottom panels) for the generation of Schrödinger cat states.
Figure 4C:
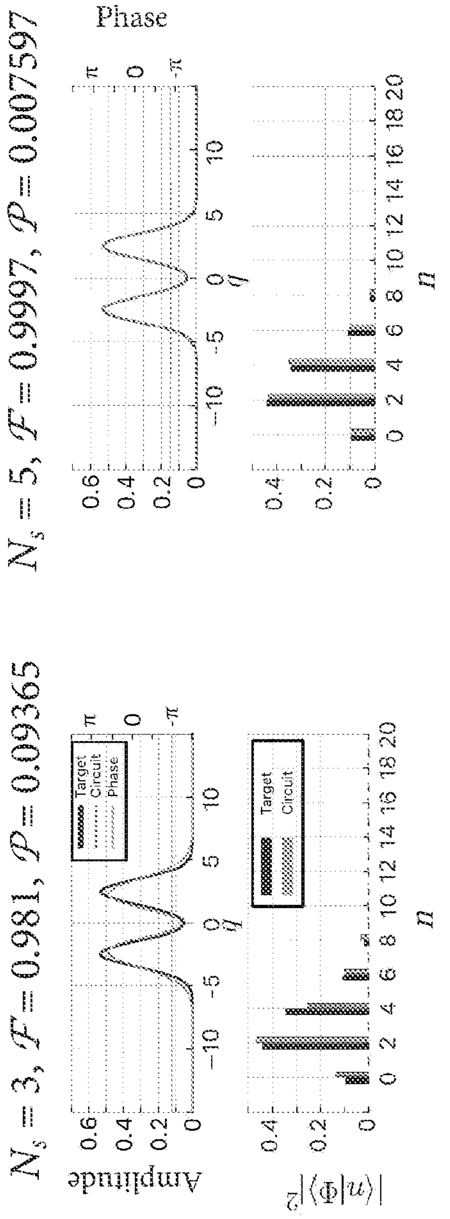
FIG. 4C is a set of plots of wavefunctions in the quadrature basis (top panels) and photon number probabilities (bottom panels) for the generation of Schrödinger cat states.

FIG. 4A, FIG. 4B and FIG. 4C show, for prophetic examples, wavefunctions in the quadrature basis $\langle q|\Phi\rangle$ (top panels) and photon number probabilities $|\langle n|\Phi\rangle|^2$ (bottom panels) for example target and QFP output states. FIG. 4A has parameters: α∈{1, 1.5, 2}, Q=3, and $N_s=3$. FIG. 4B has parameters: α=2.25, Q∈{3, 5, 7}, and $N_s=5$. FIG. 4C has parameters: α=1.75, Q=3, and $N_s\in\{3,5\}$.

Figure 5:
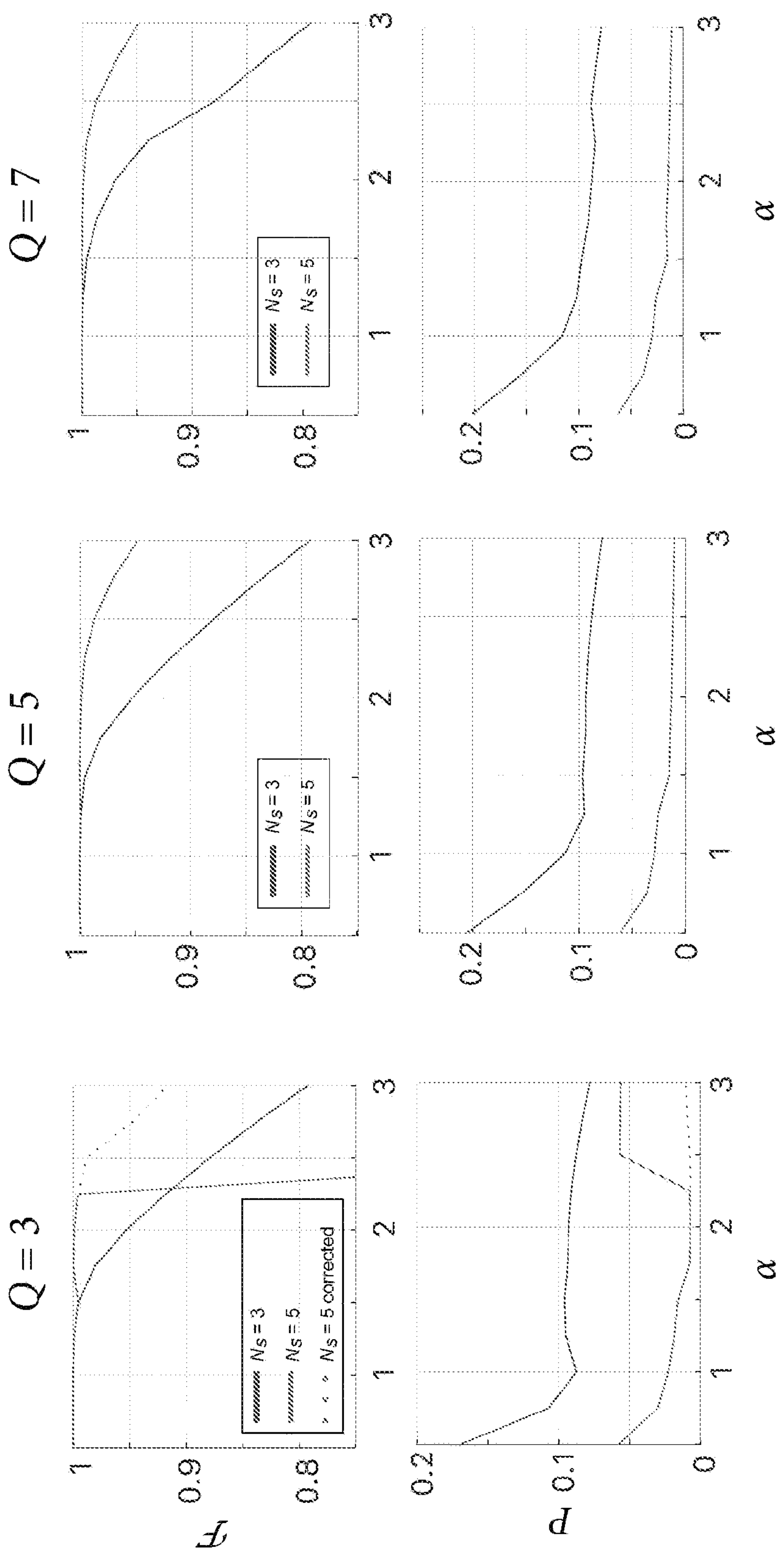
FIG. 5 is a set of plots of the fidelity (top panels) and success probability (bottom panels) for the generation of Schrödinger cat states.

To elucidate how the size of the cat state changes with α we plot, in FIG. 4A, $|\Phi_t\rangle$ (target) and $|\Phi\rangle$ (circuit), with $N_s=3$ and Q=3, for α∈{1, 1.5, 2}. The plots in FIG. 4B and FIG. 4C illustrate how the quality of $|\Phi\rangle$ changes with $N_s$ and Q for single α values, whereas FIG. 5 shows the overall trends. While running PSO it became apparent that our chosen cost function [Eq. (46)] was not ideal in that the $|\Phi\rangle$ with the lowest $\mathcal{C}$ was not always the "best" state as viewed by our intuition. For example, in FIG. 5 for α=2.5, Q=3, and $N_s=5$, the output $|\Phi\rangle$ with the lowest $\mathcal{C}$ is a state with $\mathcal{F}$<<1. Consequently, we include in FIG. 5 not only the states $|\Phi\rangle$ with the lowest cost $\mathcal{C}$, but also higher cost solutions, found with different initial conditions, that "pass the eye test" (corrected). We emphasize that this distinction does not reflect any issues in the optimization procedure itself, but rather in our selection of the cost function; to encourage PSO to find even higher fidelity states, future tests could increase the base of the logarithm beyond 10 in Eq. (46).

FIG. 5 shows, for prophetic examples, plots of fidelity (top panels) and success probability (bottom panels) plotted as functions of α (in steps of 0.25) for various combinations of $N_s$ and Q. Corrected results are shown for the $N_s$=5, Q=3 case. It is evident from FIG. 5 that for a set amount of resources, constant N, and Q, the output state quality found by PSO decreases as α increases. This can be attributed to the fact that $|\Phi_t\rangle$ becomes noticeably more non-Gaussian as α is increased, see FIG. 4A. FIG. 5 also shows that while increasing the complexity of the QFP through the number of elements Q can moderately improve the success probability, see FIG. 4B, it does not lead to markedly higher fidelities in these examples. In contrast, for any Q, the addition of more ancilla resource states (larger $N_s$) can substantially improve fidelity, particularly for larger values of a, albeit with about an order of magnitude reduction in success probability, see FIG. 5. This behavior makes sense; the extra photons available provide a greater variety of interference possibilities in design, yet also reduce the success probability through additional PNR detector conditions that are to be satisfied.

Single-mode squeezed vacuum states are especially convenient because of their zero displacement in phase space ( $\vec{x}_\beta$=0) and diagonal covariance matrix $V_0$. The latter facilitated closed-form expressions for det Γ [Eq. (14)] and $\Gamma^{-1}$ [Eq. (26)] can simplify calculations for the numerical optimizer. However, the covariance matrix just before the partial PNR detection (i.e., just after the passive Gaussian unitary operator U of FIG. 2) nevertheless remains completely general for a pure Gaussian state. Indeed, the covariance matrix of a pure Gaussian state is of the form $SV_{vac}S^T$, where $V_{vac}$ is the covariance matrix of vacuum and S is any symplectic matrix which includes squeezing. i.e., $$S = S_p S_s S'_p$$

where $S_p$ and $$S'_p$$

are passive transformations and $S_s$ is the symplectic transformation for squeezing. Since passive transformations have no effect on vacuum, the most general covariance matrix for a pure Gaussian state can thus be written as $$SV_{vac}S^T = S_P V_0 S_p^T$$

which is precisely the covariance matrix assumed in our analysis. For example, any two-mode squeezed state (like those produced in quantum frequency combs described herein) can be expressed as the interference of two single-mode squeezed states on a beamsplitter, whose unitary can be carefully incorporated in the front-end of the QFP module 304 in FIG. 3A.

Although the diagonal input covariance matrix $V_0$ does not reduce the generality of our formulation, the absence of displacement is potentially significant. Incorporating non-zero displacements will not affect the covariance matrix we have used; it will, however, introduce additional variables into the optimization procedure for generating desired non-Gaussian states.

It is possible to move beyond unitary operations as well. For example, by coupling each frequency bin to additional environmental modes, then tracing these out, photon loss can be added into the formulation. Such an extension can be useful for some implementations of a QFP.

A long-standing challenge in CV encoding is the realization of GKP qubit states for error correction. An example of the value of GKP qubits, call them $|0\rangle$ and $|1\rangle$ in the logical basis, lies in their infinite series of equispaced delta functions, $|1\rangle$ being displaced from $|0\rangle$ by $\sqrt{\pi}$ when plotted in the q-quadrature basis. Since these ideal states are unphysical, approximate states $|\tilde{0}\rangle$ and $|\tilde{1}\rangle$ were presented in the original GKP proposal, which consist of a sum of Gaussian peaks with standard deviation Δ, all under another Gaussian envelope with standard deviation $$\frac{1}{k}.$$

Δ=k=0.15 is used for $|\tilde{0}\rangle$ and $|\tilde{1}\rangle$ to maintain a 99% error correction rate. A determination of how $n_s$ and ancilla mode placement affect the quality of the output state can aid in finding effective QFP circuits for direct GKP state production.

An alternative path to quality approximations of GKP qubits, for which our system is already well suited, is the so-called "cat breeding" protocol. In some examples of the protocol, two cat states are squeezed by some amount r, where r=−lnΔ. The squeezed cat states are combined on a balanced beamsplitter, and a homodyne measurement is made on one of the output modes. When the result of the homodyne measurement for a single output mode's p-quadrature is zero, the other output mode is left in a state with three equispaced peaks. The height of the peaks follows a binomial distribution, and the width of the peaks is determined by the amount of squeezing applied to the initial cat states. Successive iterations of the protocol, where the beamsplitter inputs are the states produced by the previous iteration, yield higher-order binomial states. To ensure that the final state has the correct spacing associated with GKP states, the initial cat states have a coherent amplitude $$\alpha = \sqrt{2}^{m-1}\sqrt{\pi}e^r,$$

where m is the number of iterations of the protocol to be executed. The larger r and m are, the more closely the resulting state will resemble the approximate GKP state, making access to large cat states vital to the protocol. The cat breeding protocol can be modified to replace the homodyne measurement by PNR detection. Because PNR detection neglects the phase of the output, fine control over the relative phase of the input states may be used to achieve the same comb-like output as in the homodyne approach. In this example, by detecting four photons at one output mode after a single iteration of the protocol, numerically generated states with a fidelity of 0.996 with respect to an approximate GKP state (Δ=k=0.545) at a success probability of 0.09.

In this example, our system can generate cat states up to a size α=2 with 99.87% fidelity when $N_s$=5 and Q=7. These capabilities make our non-Gaussian state engineering system a viable candidate to meet the resource state demands set by cat breeding protocols.

In summary, we have described a system for the production of non-Gaussian quantum states using the QFP, a device designed to implement arbitrary linear-optic transformations on discrete spectral modes. Our formulation using the K function expansion enables efficient calculation of multimode Gaussian states in the photon-number basis, providing a valuable framework for analysis in any photonic DoF. Applying this to the QFP specifically, we have designed quantum circuits that produce non-Gaussian cat states with a variety of amplitudes, revealing a clear fidelity/success-probability tradeoff with the number of squeezed ancillas. The techniques described herein provide tools for designing CV quantum systems in frequency bins, and facilitate the ultimate realization of fiber-compatible, single-spatial-mode, and massively parallelizable quantum information processors based on non-Gaussian photonic states.

The techniques described herein enable implementation of a compact photonic source for arbitrary non-Gaussian states of light at a selected frequency (e.g., a selected frequency of a frequency comb source). For example, a multi-frequency-mode (spectral comb type) light source (in some cases a squeezed light source) can be used at the input. A QFP receives the input and provides a frequency-domain linear-optic unitary transformation enacted by iterating between a dispersive element and a phase modulator. At the output of the QFP a frequency-dependent element and PNR detectors can enable spectrally-resolved photon number resolving detection on frequencies other than the selected frequency (e.g., all but the selected frequency). The undetected frequency is where a particular generated quantum state is produced, in the event that a particular "click pattern" occurs on the PNR detectors.

Thus, in a compact form-factor (e.g., in a photonic integrated device), the system can provide a non-Gaussian quantum state that can be used for any of a variety of applications. For example, the source can provide high-fidelity high-rate GKP qubits, or high-quality photonic cat states, which can be used for quantum computing or all-photonic quantum repeaters. Quantum optical receiver systems for optical communications or sensing can be implemented by realizing non-Gaussian operations on a collection of optical modes, by generating off-line non-Gaussian states, and using them in conjunction with linear optics and photon detectors, to act on the received modulated signal (e.g., for communications) or on the target-return signal (e.g., sensing).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for generating a non-Gaussian quantum state, comprising:

a quantum optical frequency comb source comprising a nonlinear optical medium configured to generate a plurality of spectral modes that are spaced by a frequency-bin spacing and that include a plurality of pairs of entangled spectral modes, each of the plurality of pairs of entangled spectral modes including:

a first spectral mode centered at a first frequency; and a second spectral mode entangled with the first spectral mode and centered at a second frequency that is spaced from the first frequency by an integer multiple of the frequency-bin spacing;

a series of electrically controllable optical transformation modules, a first module of the series of electrically controllable optical transformation modules being configured to receive the plurality of spectral modes from the quantum optical frequency comb source, wherein each of two or more modules of the series of electrically controllable optical transformation modules comprises:

a spectral mode phase shifter configured to apply phase shifts to at least some of the plurality of spectral modes, the phase shifts being based on a first electrical signal; and a spectral mode mixer coupled to the spectral mode phase shifter and configured to couple, based on a second electrical signal, at least some of the plurality of spectral modes that are centered at different frequencies; and an output interface coupled to a last module of the series of electrically controllable optical transformation modules, the output interface comprising:

a plurality of photon number resolving (PNR) detectors configured to detect a first subset of the plurality of spectral modes outputted by the last module, the first subset comprising more than one and fewer than all of the plurality of spectral modes; and an output port configured to output a second subset of the plurality of spectral modes outputted by the last module, the second subset comprising one or more spectral modes not detected by any of the plurality of PNR detectors.

2. The apparatus of claim 1, wherein one or more of the series of electrically controllable optical transformation modules are configured to transform each of the plurality of pairs of entangled spectral modes into single-mode squeezed vacuum states.

3. The apparatus of claim 1, wherein each spectral mode phase shifter comprises a Fourier-transform pulse shaper.

4. The apparatus of claim 1, wherein each spectral mode mixer comprises an electro-optic phase modulator.

5. The apparatus of claim 1, wherein the output interface further comprises a wavelength-dependent element positioned between the last module and the plurality of PNR detectors.

6. The apparatus of claim 5, wherein the wavelength-dependent element comprises at least one of a grating or and a prism.

7. The apparatus of claim 1, wherein each of the plurality of PNR detectors is configured to generate a detection signal that:

distinguishes a detected photon number equal to zero from a detected photon number equal to one, in each of a plurality of time slots; and distinguishes a detected photon number equal to one from at least one detected photon number greater than one, in each of the plurality of time slots.

8. The apparatus of claim 7, further comprising a trigger module configured to generate a trigger signal based on detection signals from the plurality of PNR detectors, the detection signals indicating one or more of the plurality of time slots during which the output port outputted the second subset, the second subset corresponding to a non-Gaussian quantum state.

9. The apparatus of claim 8, wherein the non-Gaussian quantum state comprises a quantum superposition of continuous variable (CV) optical wave quadrature states.

10. The apparatus of claim 9, wherein the quantum superposition comprises a superposition of optical waves with opposite phases.

11. The apparatus of claim 8, wherein the non-Gaussian quantum state is input to a module that includes one or more optical elements that provide at least one Gottesman-Kitaev-Preskill (GKP) qubit.

12. The apparatus of claim 11, wherein the one or more optical elements include at least one optical beamsplitter.

13. The apparatus of claim 8, wherein the trigger signal is based on detection signals that include a plurality of the detection signals, each of the plurality of detection signals indicating a photon number of zero in at least one of the plurality of time slots.

14. The apparatus of claim 1, wherein the last module of the series of electrically controllable optical transformation modules consists essentially of a spectral mode mixer configured to couple, based on an electrical signal, spectral modes that are centered at different frequencies.

15. The apparatus of claim 14, wherein the first module of the series of electrically controllable optical transformation modules consists essentially of a spectral mode mixer configured to couple, based on an electrical signal, spectral modes that are centered at different frequencies.

16. The apparatus of claim 1, wherein a plurality of modules of the series of electrically controllable optical transformation modules are integrated on a common photonic integrated circuit.

17. The apparatus of claim 1, wherein the frequency-bin spacing is a free spectral range of an optical parametric oscillator that includes the nonlinear optical medium.

18. A method for generating a non-Gaussian quantum state, comprising:

generating, from a quantum optical frequency comb source comprising a nonlinear optical medium, a plurality of spectral modes that are spaced at a frequency-bin spacing and that include a plurality of pairs of entangled spectral modes, each of the plurality of pairs of entangled spectral modes including:

a first spectral mode centered at a first frequency;

a second spectral mode entangled with the first spectral mode and centered at a second frequency that is spaced from the first frequency by an integer multiple of the frequency-bin spacing;

receiving, by a first module of a series of electrically controllable optical transformation modules, a plurality of spectral modes from the quantum optical frequency comb source, wherein each of two or more modules of the series of electrically controllable optical transformation modules comprises:

a spectral mode phase shifter configured to apply phase shifts to at least some of the plurality of spectral modes, the phase shifts being based on a first electrical signal; and a spectral mode mixer coupled to the spectral mode phase shifter and configured to couple, based on a second electrical signal, spectral modes that are centered at different frequencies;

detecting, using a plurality of photon number resolving (PNR) detectors, a first subset of the plurality of spectral modes outputted by a last module of the series of electrically controllable optical transformation modules, the first subset comprising more than one and fewer than all of the plurality of spectral modes; and outputting, via an output port, a second subset of the plurality of spectral modes outputted by the last module, the second subset comprising one or more spectral modes not detected by any of the plurality of PNR detectors.

19. An apparatus for generating a non-Gaussian quantum state, comprising:

a quantum optical frequency comb source comprising at least one nonlinear optical medium and configured to provide a plurality of spectral modes spaced at a frequency-bin spacing;

a plurality of electrically controllable optical transformation modules connected in series with a first module in the series receiving spectral modes from the quantum optical frequency comb source, where two or more of the modules each comprise:

a spectral mode phase shifter configured to apply respective phase shifts to different spectral modes based on at least a first electrical signal; and a spectral mode mixer coupled to the spectral mode phase shifter and configured to couple spectral modes centered at different frequencies based on at least a second electrical signal; and an output interface coupled to a last module in the series, the output interface including:

a plurality of photon number resolving (PNR) detectors configured to detect respective spectral modes of more than one and fewer than all spectral modes output from the last module in the series; and at least one port providing at least one output spectral mode from the last module in the series not detected by any of the PNR detectors;

wherein each PNR detector is configured to generate a detection signal that:

distinguishes a detected photon number equal to zero from a detected photon number equal to one, in each of a plurality of time slots; and distinguishes a detected photon number equal to one from at least one detected photon number greater than one, in each of the plurality of time slots.

20. The apparatus of claim 19, wherein the number of spectral modes spaced at a frequency-bin spacing is three or more.

21. The apparatus of claim 19, further comprising a trigger module configured to generate a trigger signal based on detection signals from the plurality of PNR detectors indicating one or more time slots in which the port providing at least one output spectral mode corresponds to a non-Gaussian quantum state.

22. The apparatus of claim 19, wherein the plurality of spectral modes provided by the quantum optical frequency comb source comprise a Gaussian state.

23. The apparatus of claim 19, wherein the plurality of spectral modes provided by the quantum optical frequency comb source comprise a continuous-variable encoded state.

* * * * *